US012574798B2

(12) United States Patent
Shekhar et al.

(10) Patent No.: US 12,574,798 B2
(45) Date of Patent: Mar. 10, 2026

(54) ENHANCEMENTS TO 5G ACCESS TRANSPORT STEERING SWITCHING AND SPLITTING FOR STEERING NETWORK TRAFFIC

(71) Applicant: Cisco Technology, Inc., San Jose, CA (US)

(72) Inventors: Ravi Shekhar, Maharastra (IN); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 17/858,632

(22) Filed: Jul. 6, 2022

(65) Prior Publication Data

US 2024/0015590 A1 Jan. 11, 2024

(51) Int. Cl.
*H04W 28/086* (2023.01)
*H04W 76/15* (2018.01)

(52) U.S. Cl.
CPC ......... *H04W 28/086* (2023.05); *H04W 76/15* (2018.02)

(58) Field of Classification Search
CPC ... H04W 28/086; H04W 76/15; H04W 76/16; H04W 84/042; H04W 88/06; H04W 60/005; H04W 48/18; H04W 28/0846; H04W 28/02; H04W 28/0268; H04W 28/0804
See application file for complete search history.

(56) References Cited

U.S. PATENT DOCUMENTS

2019/0306068 A1* 10/2019 Kiss ..................... H04W 80/06
2019/0306752 A1 10/2019 Lai
2019/0357294 A1* 11/2019 Ha ........................ H04W 76/15
2020/0404609 A1 12/2020 Huang-Fu et al.
2021/0258868 A1* 8/2021 Wong .................... H04W 4/029
(Continued)

FOREIGN PATENT DOCUMENTS

WO 2021035206 2/2021
WO 20210250374 12/2021
(Continued)

OTHER PUBLICATIONS

LG Electronics, "URSP Rule and ATSSS Rule", SA WG2 Meeting #127, S2-183581 (Year: 2018).*

*Primary Examiner* — Ayaz R Sheikh
*Assistant Examiner* — Mang Boi Thawng
(74) *Attorney, Agent, or Firm* — Polsinelli P.C.

(57) ABSTRACT

Disclosed herein are systems, methods, and computer-readable media for enhancements to 5G Access Transport Steering Switching & Splitting (ATSSS) rules. In one aspect, a method includes receiving, at a network controller, a request for a Multi-Access Protocol Data Unit (MA-PDU) session from a user device, the request including a "Multi access multi PLMN" flag for requesting multiple Public Land Mobile Network (PLMN) sessions; generating, at the network controller, an access transport steering switching and splitting (ATSSS) rule for steering traffic associated with the user device between at least two PLMNs once the multiple PLMN sessions are established between the user device and the at least two PLMNs; and sending the steering rule to the user device to be used for splitting uplink network traffic transmitted between the user device and the at least two PLMNs.

20 Claims, 9 Drawing Sheets

(56)                    References Cited

U.S. PATENT DOCUMENTS

| 2022/0264370 | A1* | 8/2022 | Qiao | H04W 60/00 |
| 2022/0295277 | A1* | 9/2022 | Salkintzis | H04W 12/0431 |
| 2022/0330195 | A1* | 10/2022 | Chen | H04W 60/005 |
| 2023/0056442 | A1* | 2/2023 | Ly | H04W 24/08 |
| 2023/0144323 | A1* | 5/2023 | Catovic | H04W 8/183 |
| | | | | 370/329 |
| 2023/0319634 | A1* | 10/2023 | Youn | H04W 80/10 |
| | | | | 370/229 |
| 2023/0328593 | A1* | 10/2023 | Qiao | H04W 60/04 |
| | | | | 370/229 |
| 2024/0015562 | A1* | 1/2024 | Youn | H04W 24/10 |
| 2024/0205861 | A1* | 6/2024 | Wang | H04W 48/18 |

FOREIGN PATENT DOCUMENTS

| WO | WO-2023078577 | A1 * | 5/2023 | H04W 40/02 |
| WO | WO-2023165720 | A1 * | 9/2023 | |

\* cited by examiner

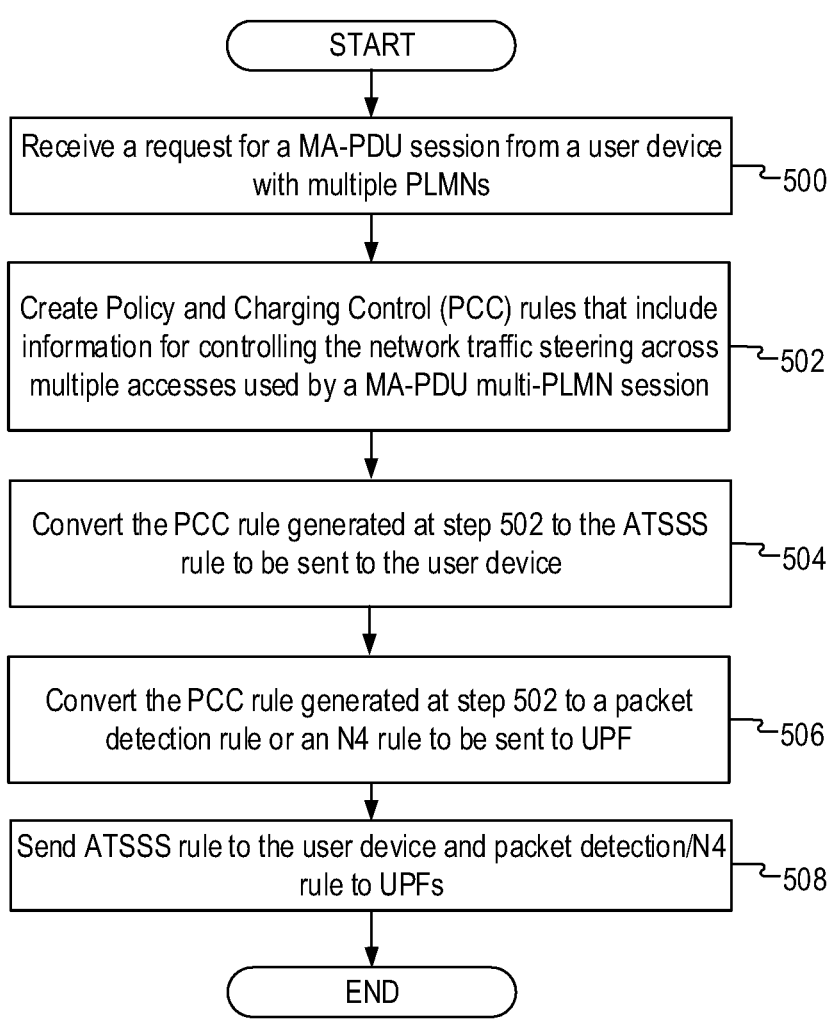

START

Receive a request for a MA-PDU session from a user device with multiple PLMNs ⌐⌐500

Create Policy and Charging Control (PCC) rules that include information for controlling the network traffic steering across multiple accesses used by a MA-PDU multi-PLMN session ⌐⌐502

Convert the PCC rule generated at step 502 to the ATSSS rule to be sent to the user device ⌐⌐504

Convert the PCC rule generated at step 502 to a packet detection rule or an N4 rule to be sent to UPF ⌐⌐506

Send ATSSS rule to the user device and packet detection/N4 rule to UPFs ⌐⌐508

END

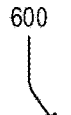

| Information Name | Description | PCF permitted to modify for a dynamic PCC rule in SMF |
|---|---|---|
| MA PDU Multi PLMN Session Control | *This part defines information supporting control of MA PDU Sessions* | |
| PLMNs in the session | SNPN-1 and PLMN-2 | |
| Steering mode | Indicates the rule for distributing traffic between different PLMNs (Active-Standby, Smallest-Delay, Load-Balancing), together with the associated parameters such as allowed access types, weights etc. | Yes |
| PLMN-2 Block | Assuming PLMN-2 has both 3GPP access and Non-3GPP access | |
| Aggregation method | Indicates the applicable traffic aggregation method : Values: MPTCP proxy, NULL, , etc | Yes |
| Steering mode | Indicates the rule for distributing traffic between accesses (Active-Standby, Smallest-Delay, Load-Balancing), together with the associated parameters such as allowed access types, weights etc. The PCF may indicate separate values for up-link and down-link directions. The actual content depends on the detailed steering modes concluded. | Yes |
| Charging for 3GPP access | Indicates parameters used for charging packets carried via 3GPP access for a MA PDU Session. The same set of parameters as for the Charging information above applies. If a parameter is not included here, the value provided in the Charging information above applies. | Yes |
| Charging for N3GPP access | Indicates parameters used for charging packets carried via N3GPP access for a MA PDU Session. The same set of parameters as for the Charging information above applies. If a parameter is not included here, the value provided in the Charging information above applies. | Yes |
| PLMN-1 block (for SNPN-1) | Assuming SNPN-1 block has only 3GPP access | |
| Charging for 3GPP access | Indicates parameters used for charging packets carried via 3GPP access for a MA PDU Session. The same set of parameters as for the Charging information above applies. If a parameter is not included here, the value provided in the Charging information above applies. | Yes |

ENHANCEMENTS TO 5G ACCESS TRANSPORT STEERING SWITCHING AND SPLITTING FOR STEERING NETWORK TRAFFIC

TECHNICAL FIELD

The subject matter of this disclosure relates in general to the field of computer networking, and more particularly, to enhancements to Access Transport Steering Switching & Splitting (ATSSS) rules for steering network traffic associated with a user device between multiple networks that provide 3GPP access and/or Non-3GPP access to the user device.

BACKGROUND

Current mobile and wireless communication systems have widely adopted a next-generation wireless communication system, 5G that provides much higher data rates and lower latency. With the 5G evolution, a concept known as Private 5G (P5G) has been introduced. P5G uses 5G-enabled technologies (e.g., 3GPP access), but allows the owner to provide priority access or licensing for its wireless spectrum or dedicated bandwidth. As follows, an enterprise can be provided with an isolated 5G network, which can be dedicated to the enterprise for its specific use cases.

Furthermore, communication advancements have enabled devices to have multiple SIM cards allowing them to establish multiple connections with different networks. Standards have been developed to define the rules and protocols for user devices to establish the connections simultaneously using 3$^{rd}$ Generation Partnership Project (3GPP) access such as cellular connection and/or non-3GPP access such as a Wi-Fi connection.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 5 describes a process for network traffic steering when a multi-PLMN connection is established for a user device, according to some aspects of the present disclosure;

FIG. 6 illustrates an example of enhancements to a PCC rule, according to some aspects of the present disclosure;

DETAILED DESCRIPTION

Figure 1A:
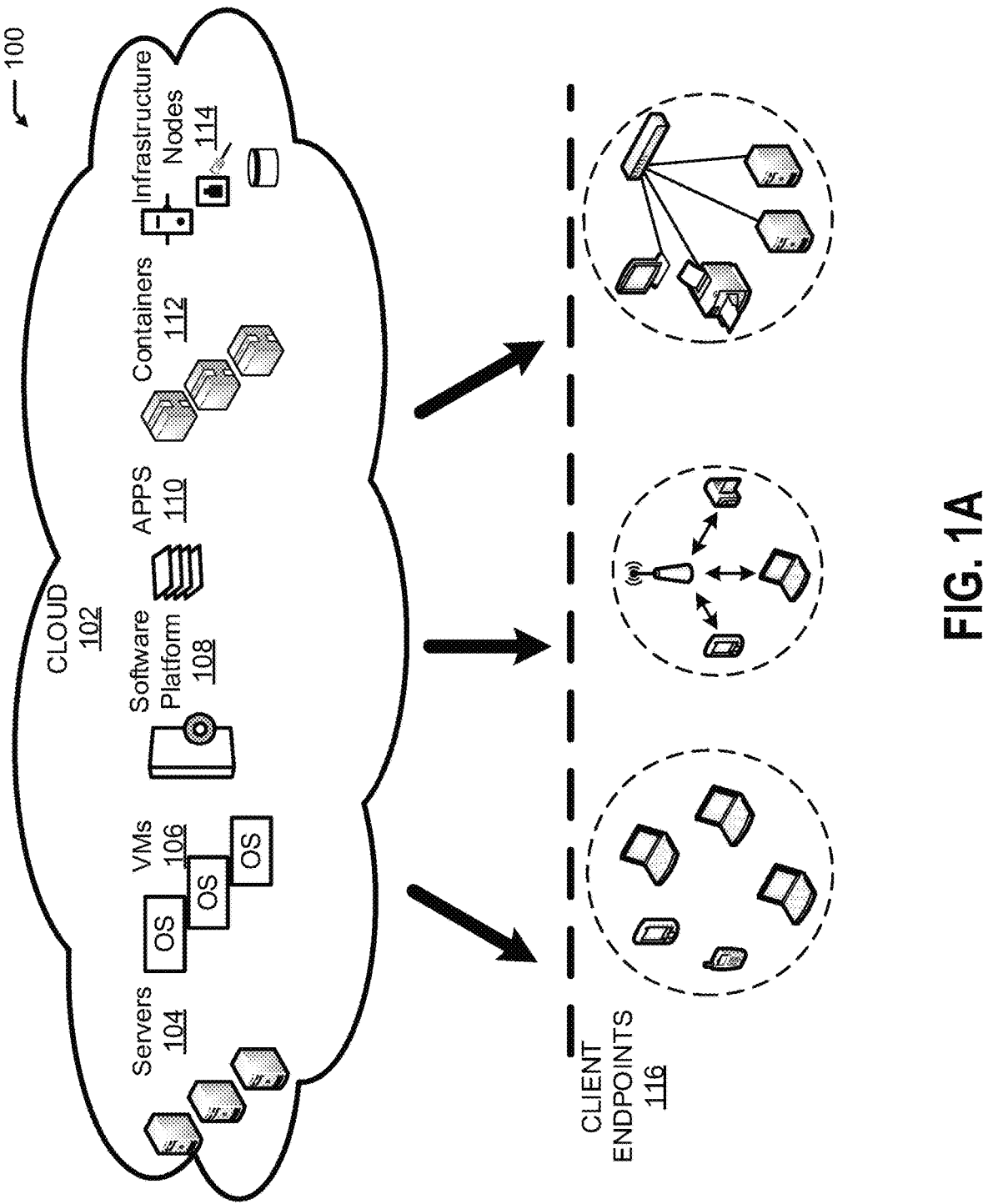
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for enhancements to 5G Access Transport Steering Switching & Splitting (ATSSS) rules, which currently do not provide a solution for steering network traffic between two or networks (e.g., a Standalone Non-Public Network (SNPN) and a Public Land Mobile Network (PLMN), between two PLMNs, etc.) to which a user device is subscribed and connected. As will be described below, the present disclosure provides a number of changes to the design and architecture of messages and protocols used to established Multi Access Protocol Data Unit (MA-PDU) sessions to define rules for steering network traffic between different 3GPP access-based networks to which a user device is connected as well as steering network traffic between two different access types within a given PLMN or SNPN network (e.g., between a 3GPP access and a non-3GPP (e.g., Wi-Fi) access).

In one aspect, a method includes receiving, at a network controller, a request for a Multi-Access Protocol Data Unit (MA-PDU) session from a user device, the request including a "Multi access multi PLMN" flag for requesting multiple Public Land Mobile Network (PLMN) sessions; generating, at the network controller, an access transport steering switching and splitting (ATSSS) rule for steering traffic associated with the user device between at least two PLMNs once the multiple PLMN sessions are established between the user device and the at least two PLMNs; and sending the steering rule to the user device to be used for splitting uplink network traffic transmitted between the user device and the at least two PLMNs.

In another aspect, a first PLMN of the least two PLMNs provides a first 3GPP access for the user device and a second PLMN of the at least two PLMNs provides a second 3GPP access and a non-3GPP access for the user device.

In another aspect, the ATSSS rule defines a first set of parameters for splitting the uplink network traffic between the first PLMN and the second PLMN, and a second set of parameters for splitting the traffic between second 3GPP access and the non-3GPP access within the second PLMN.

In another aspect, the user device accesses the second PLMN via at least one of an NWu interface and an NWt interface.

In another aspect, the request is based on a User Equipment Route Selection Policy (URSP) with an Access Type Preference field that includes the "Multi access multi PLMN" flag.

In another aspect, generating the steering rule includes generating, at a Policy and Charging Control (PCF) component, a Policy and Charging Control (PCC) rule for steering the traffic, converting the PCC rule to the ATSSS rule using a Session Management Function (SMF) to be sent to the user device, and converting the PCC rule to a Packet Detection rule or an N4 rule by the SMF to be sent to a User Plane Function (UPF), wherein the ATSSS rule is used for steering the uplink network traffic and the packet detection or the N4 rule is used for steering downlink traffic destined for the user device.

In another aspect, the ATSSS rule includes a precedence value identifying a priority of the ATSSS rule relative to other existing ATSSS rules; a traffic descriptor for identifying a service data flow (SDF) including an application identifier, a destination address, a destination port, a destination FQDN, and a non-IP descriptor; a PLMN ID for each of the at least two PLMNs to which the ATSSS rule for traffic steering applies; and a steering mode identifying how a matching SDF should be steered across 3GPP and non-3GPP accesses, the steering mode being one of an active-standby mode, smallest delay mode, load-balancing mode, and priority-based mode.

In one aspect, a network controller includes one or more memories having computer-readable instructions stored thereon and one or more processors. The one or more processors are configured to execute the computer-readable instructions to receive a request for a Multi-Access Protocol Data Unit (MA-PDU) session from a user device, the request including a "Multi access multi PLMN" flag for requesting multiple Public Land Mobile Network (PLMN) sessions; generate an access transport steering switching and splitting (ATSSS) rule for steering traffic associated with the user device between at least two PLMNs once the multiple PLMN sessions are established between the user device and the at least two PLMNs; and send the steering rule to the user device to be used for splitting uplink network traffic transmitted between the user device and the at least two PLMNs.

In one aspect, one or more non-transitory computer-readable media include computer-readable instructions, which when executed by one or more processors associated with a network controller, cause the network controller to receive a request for a Multi-Access Protocol Data Unit (MA-PDU) session from a user device, the request including a "Multi access multi PLMN" flag for requesting multiple Public Land Mobile Network (PLMN) sessions; generate an access transport steering switching and splitting (ATSSS) rule for steering traffic associated with the user device between at least two PLMNs once the multiple PLMN sessions are established between the user device and the at least two PLMNs; and send the steering rule to the user device to be used for splitting uplink network traffic transmitted between the user device and the at least two PLMNs.

Description of Example Embodiments

The following acronyms are used throughout the present disclosure, provided below for convenience.

AAA: Authentication, Authorization, and Accounting
AMF: Access and Mobility Management Function
AUSF: Authentication Server Function
MUD: Manufacturer Usage Description
NF: Network Function
NG-RAN: Net Generation Radio Access Network
NSSAAF: Network Slice-Specific Authentication and Authorization Function
SIB: System Information Block
SIM: Subscriber Identity Module
SMF: Session Management Function
SNPN: Standalone Non-Public Network
PLMN: Public Land Mobile Network
SUCI: Subscription Concealed Identifier
SUPI: Subscription Permanent Identifier
UPF: User Plane Function
PDU: Protocol Data Unit
ATSSS: Access Transport Steering Switching & Splitting
PCC: Policy and Charging Control
PCF: Policy Control Function
3GPP: $3^{rd}$ Generation Partnership Project As noted above, in private 5G, an enterprise can own a dedicated spectrum so that the private 5G network does not share traffic with other cellular networks in the vicinity. A private network, also known as non-public network (NPN), can be deployed as (1) an SNPN (Stand Alone Private Network), which operates independently from a PLMN; and (2) PNI-NPN (Public Network Integrated Non-Public Network), which is deployed with the support of the PLMN. Also, SNPN can have two different sub-types: (1)ON-SNPN (Onboarding SNPN); and (2)SO-SNPN (Subscription Owned SNPN).

An existing process of onboarding a UE includes Universal SIM (USIM) or embedded SIM (eSIM) provisioning to allow a subscriber to access a specific provider's network. Many UEs (user devices) have dual SIM cards allowing them to subscribe to multiple 3GPP access networks (e.g., two PLMNs, one PLMN and one SNPN, etc.).

In 3GPP Release 16 (Rel-16), the ATSSS feature is introduced where for a given PDU session, flows can be distributed across 3GPP and non-3GPP Access for a UE having dual SIM subscription. Currently 3GPP specifications allow for distribution of network traffic for such a UE across one 3GPP and one non-3GPP access. In Rel-16, 3GPP also introduced SNPN network where a UE can access SNPN 5G Core (5GC) on 3GPP Access. 3GPP also suggested architecture where a UE can access an overlay PLMN through an underlay SNPN network. What this means is that a UE having 2 SIM Profiles (i.e., one SIM profile for a PLMN and one for a SNPN) can connect to two 3GPP accesses simultaneously and at the same time connect to the PLMN via the non-3GPP access as well.

Currently, when a UE makes a MA-PDU session with a PLMN (when the UE is subscribed to both the PLMN and an SNPN), the UE can access the PLMN via a NWu interface with a SNPN and a NWt interface via a trusted non-3GPP access or via a 3GPP access to the PLMN. However, the current architecture does not provide a solution for how to steer network traffic to and from a user device between two PLMNs that the user device is subscribed to.

The present disclosure provides enhancements to the ATSSS architecture and the messages and protocols used to establish Multi Access Protocol Data Unit (MA-PDU) sessions, to define rules for steering network traffic between different 3GPP access networks to which a UE is subscribed as well as steering network traffic between two different access types within a given PLMN or SNPN network (e.g., between a 3GPP access and a non-3GPP access). These enhancements will be described more fully with reference to FIGS. 3-6.

Figure 1B:
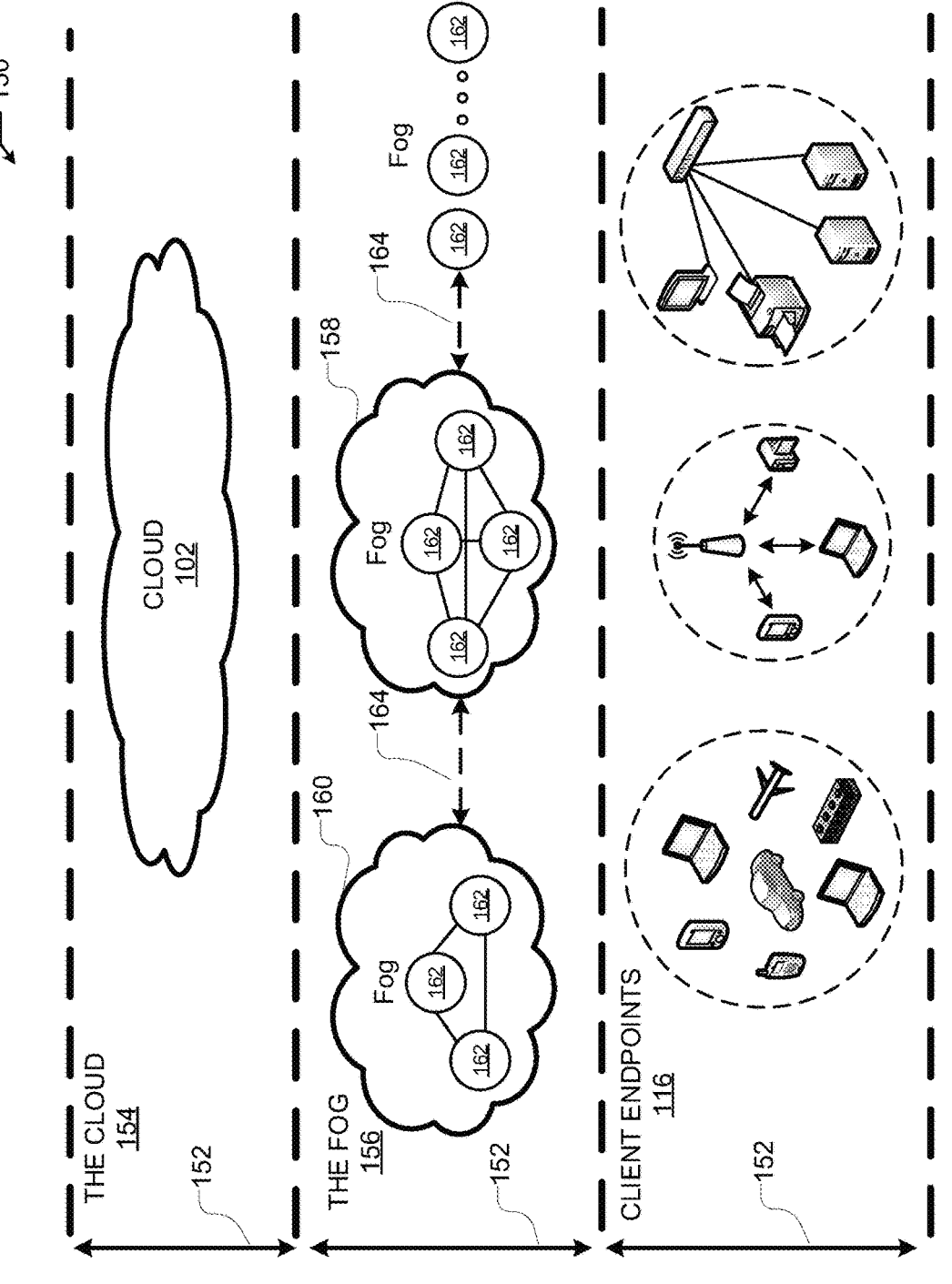
FIG. 1B illustrates an example fog computing architecture
Figure 2:
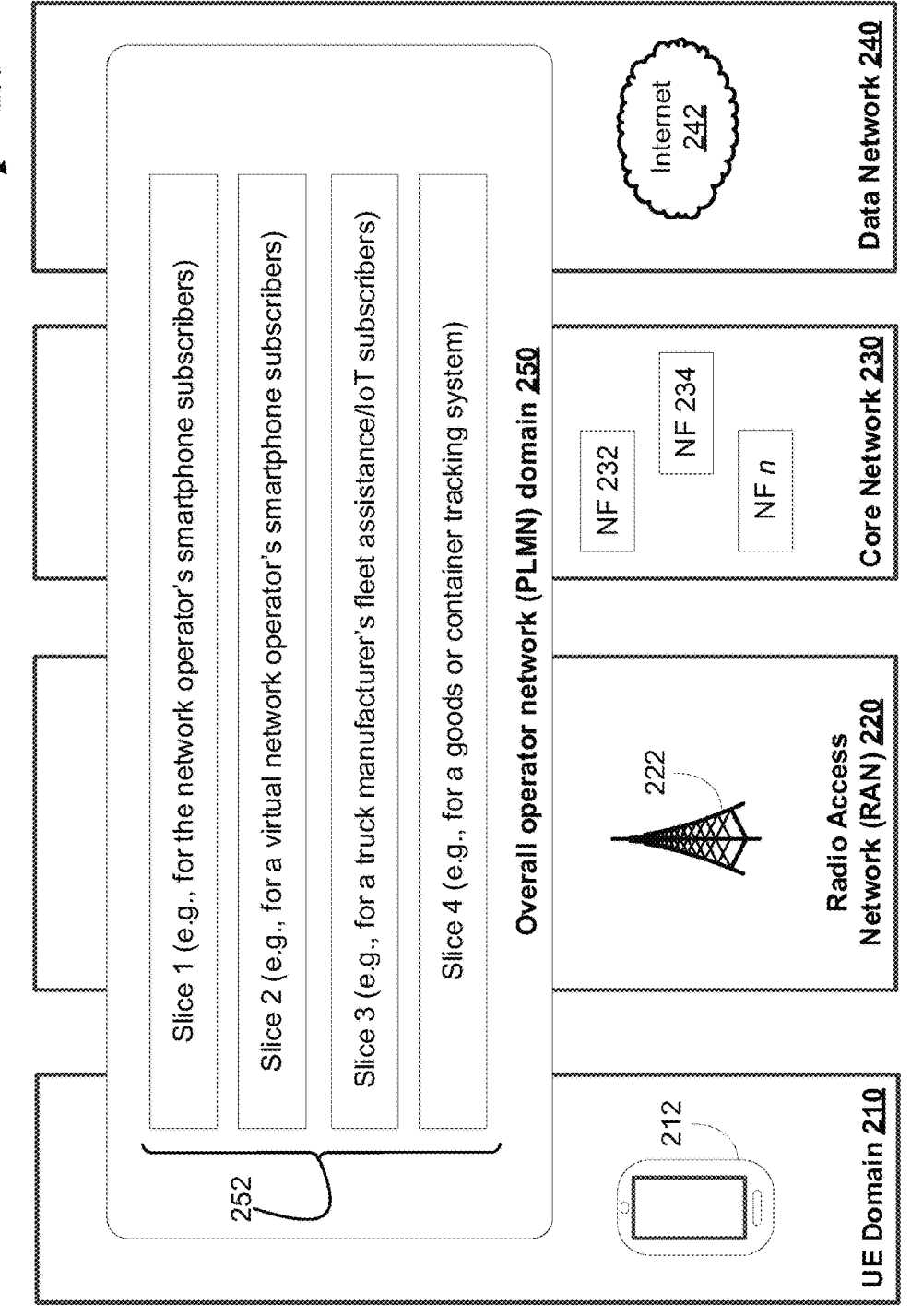
FIG. 2 depicts an exemplary schematic representation of a 5G network environment in which network slicing has been implemented, and in which one or more aspects of the present disclosure may operate.

The disclosure begins with a description of example enterprise networks and 5G networks with reference to FIGS. 1A-1B and 2.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as a train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCF s); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer need.

3GPP provides standards for 5G communication. As noted above, in Rel-16, 3GPP the ATSSS feature is introduced where for a given PDU session, flows can be distributed across 3GPP and non-3GPP Access for a UE having dual SIM subscription. Currently 3GPP specifications allow for distribution of network traffic for such a UE across one 3GPP and one non-3GPP access. In Rel-16, 3GPP also introduced SNPN network where a UE can access SNPN 5G Core (5GC) on 3GPP Access. 3GPP also suggested architecture where a UE can access an overlay PLMN through an underlay SNPN network. What this means is that a UE having 2 SIM Profiles (i.e., one SIM profile for a PLMN and one for a SNPN) can connect to two 3GPP accesses simultaneously and at the same time connect to the PLMN via the non-3GPP access as well.

Currently, when a UE makes a MA-PDU session with a PLMN (when the UE is subscribed to both the PLMN and an SNPN), the UE can access the PLMN via a NWu interface with a SNPN and a NWt interface via a trusted non-3GPP access or via a 3GPP access to the PLMN. However, the current architecture does not provide a solution for how to steer network traffic to and from a user device between two PLMNs that the user device is subscribed to.

The present disclosure provides enhancements to the ATSSS architecture and the messages and protocols used to establish Multi Access Protocol Data Unit (MA-PDU) sessions, to define rules for steering network traffic between different 3GPP access networks to which a UE is subscribed as well as steering network traffic between two different access types within a given PLMN or SNPN network (e.g., between a 3GPP access and a non-3GPP access). These enhancements will be described more fully with reference to FIGS. 3-6.

Figure 3:
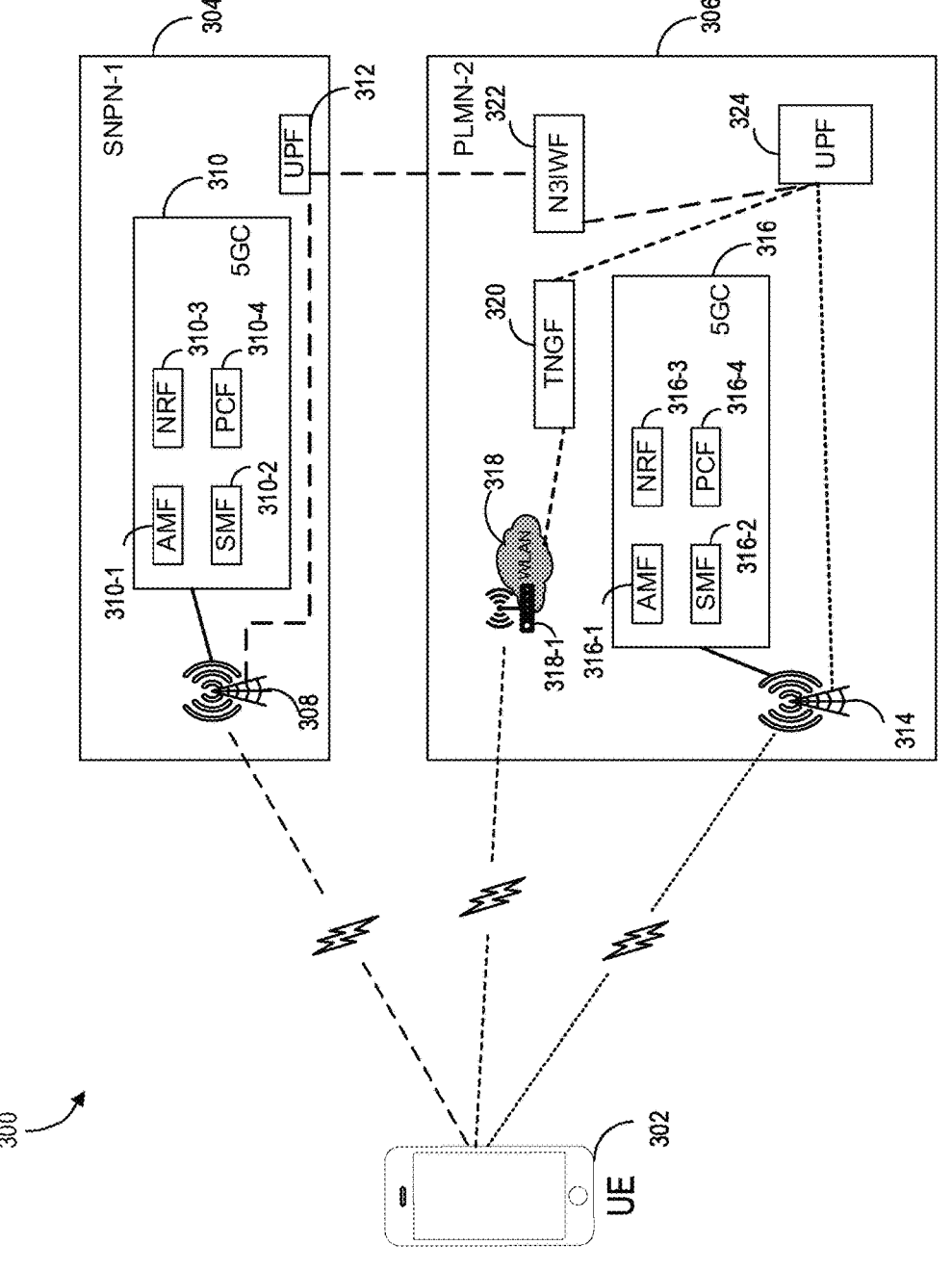
FIG. 3 illustrates an example 5G multi-PLMN environment that can provide connectivity to a user device, according to some aspects of the present disclosure.

FIG. 3 illustrates an example 5G multi-PLMN environment that can provide connectivity to a user device, according to some aspects of the present disclosure.

Multi-PLMN environment 300 of FIG. 2 (or simply environment 300), can include one or more user devices such as UE 302. While FIG. 3 shows only a single UE 302, any number of UEs such as UE 302 may be in environment 300 and capable of establishing multiple connections with different PLMNs shown in FIG. 3. UE 302 may be a dual or multi-SIM device with each SIM providing a subscription (or network connectivity) to the corresponding PLMN and/ or SNPN for UE 302.

Environment 300 further includes two example PLMNs 304 and 306. PLMN 304 is shown as an SNPN-1. For purposes of the present disclosure, a PLMN and an SNPN may be the same (e.g., each being a complete 5G network that can provide cellular services and connectivity to UE 302). Therefore, any reference made to multiple or two or more PLMNs, can also include a PLMN and an SNPN network.

SNPN-1 304 can include one or more access points such as access point 308, which can be a gNode-B. SNPN-1 304 can also include a complete 5G core (5GC) 310 with any number of suitable network functions including, but not limited to, AMF 310-1, SMF 310-2, NRF 310-3, PCF 310-4, etc. In addition to accessing network resources of SNPN-1 304 by connecting directly thereto, UE 302 can also connect to PLMN 306 via UPF 312 and a NWu interface (SNPN-1 304 may be an underlay providing UE 302 an alternative access to PLMN 306). In one example SNPN-1 may be a private 5G network utilized within an enterprise network described above with reference to FIGS. 1 and 2.

PLMN 306 may be a network having both a 3GPP access (e.g., 5G, 4G/LTE) and a non-3GPP access (e.g., Wi-Fi). PLMN 306 may include a 3GPP access point 314 (e.g., a gNode-B) and a 5GC 316 that may include same or similar NFs as 5GC 310 including, but not limited to, AMF 316-1, SMF 316-2, NRF 316-3, and PCF 316-4. Access point 314 can provide UE 302 with user plane function and access to UPF 324.

PLMN 306 may further include a non-3GPP network such as Wireless Local Area Network (WLAN) 318 having an associated non-3GPP access point 318-1 (e.g., a Wi-Fi access point, router, etc.). WLAN 318 may include any additional known and/or to be development element or components for providing non-3GPP access to UE 302. WLAN 318 may provide connectivity for UE 302 to UPF 324 via Trusted Non-3GPP Gateway Function (TNGF) 320.

As noted above, SNPN-1 304 may function as an underlay to provide UE 302 an alternative path to PLMN 306 via an NWu interface between UPF 312 and non-3GPP Interworking Function (N3IWF) 322.

Figure 4:
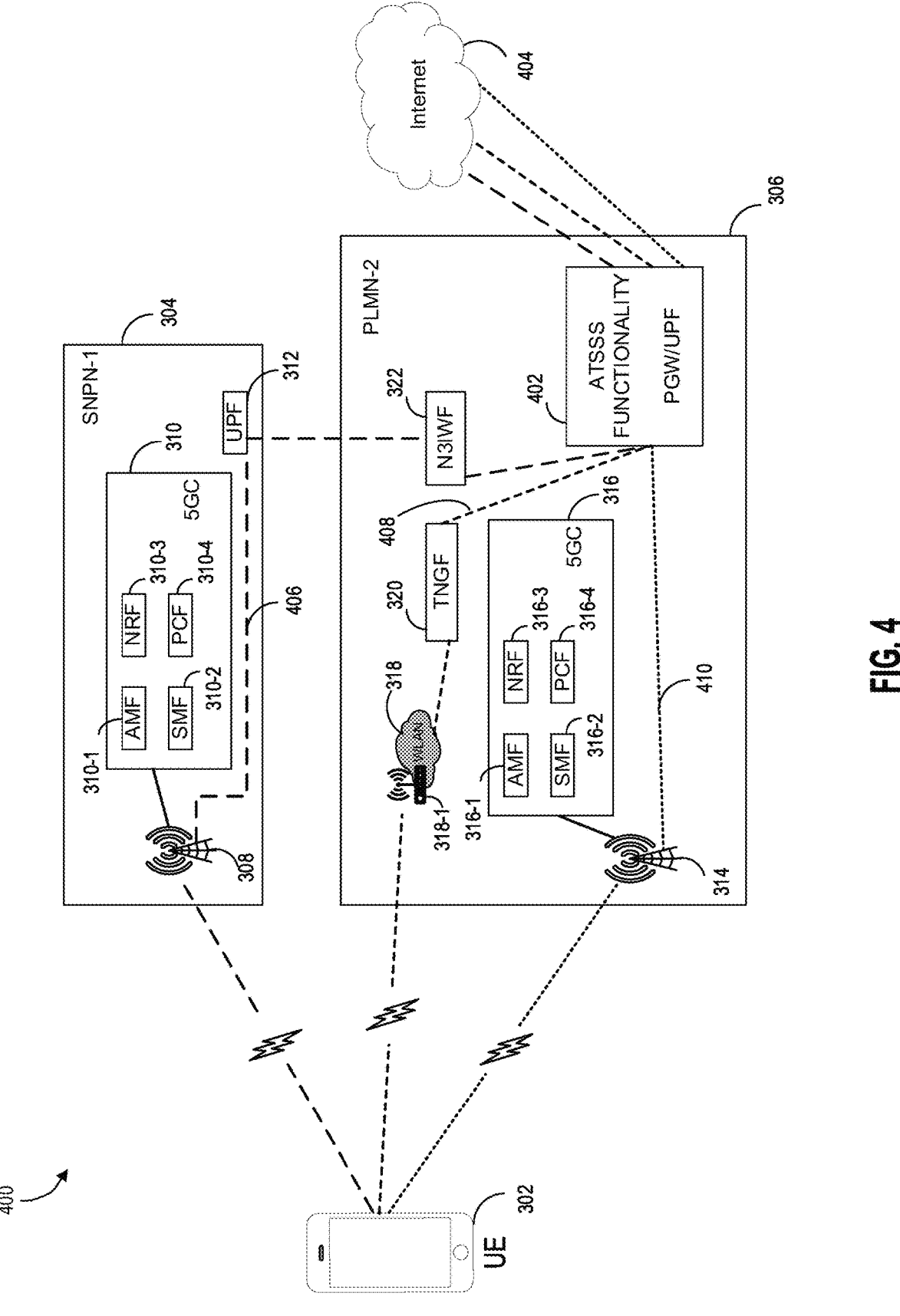
FIG. 4 illustrates an example 5G multi-PLMN environment with ATSSS functionality, according to some aspects of the present disclosure.

FIG. 4 illustrates an example 5G multi-PLMN environment with ATSSS functionality, according to some aspects of the present disclosure. Elements with the same reference numerals in FIGS. 3 and 4 are the same and hence will not be further described with reference to FIG. 4 for sake of brevity.

In FIG. 4, such ATSSS functionality, to which the present disclosure provides several enhancements as will be described below, may reside in the PGW/UPF 402, through which UE 302 may access Internet 404. Connection between UE 302 and Internet 402 can be established in three different ways in the example of FIG. 4 (i.e., through 3GPP access using SNPN-1 304 and PLMN-2 306 as shown via line 406, through non-3GPP access via WLAN 318 as shown via line 408, and through 3GPP access via PLMN-2 306 as shown via line 410).

In one example, to handle MA-PDU sessions across multiple PLMNs, a dual SIM UE such as UE 302 is capable of ATSSS and may be connected to SNPN-1 304 over 3GPP Access (e.g., or 4G via, for example, access point 308 5GC 310) and PLMN-2 306 over multiple accesses such as 3GPP access (e.g., 4G or 5G via, for example, access point 314 and 5GC 316) and non-3GPP access (e.g., WiFi via WLAN 318 and Wi-Fi access point 318-1).

3GPP core for both the networks are different (e.g., 5GC 310 of SNPN-1 304 and 5GC 318 of PLMN-2 306) and different UPFs (e.g., UPF 312 of SNPN-1 or UPF 402 of PLMN-2 306) are selected by respective SMF s (e.g., SMF 310-2 of SNPN-1 and SMF 316-2 of PLMN-2 306) for data flows. UPF 402 which has ATSSS functionality has internet connectivity through an N6 interface and may be considered as PDU Session Anchor UPF (PSA-UPF), which may also be referred to as the anchor UPF for UE 302. In such cases network may send 2 ATSSS rules to UE 302.

One ATSSS rule may be ATSSS rule at PLMN level. This rule enables UE 302 to decide in splitting its network traffic between 2 PLMNs (e.g., a rule for network traffic steering (splitting) between SNPN-1 304 and PLMN-2 306 in the example of FIG. 4). The other ATSSS rule may be within a PLMN (e.g., PLMN-2 306). This rule may enable UE 302 to decide in splitting the network traffic steering between 2 different accesses within PLMN-2 306 (e.g., rule for network traffic steering between 3GPP access and non-3GPP access in PLMN-2 306 in the example of FIG. 4).

FIG. 5 describes a process for network traffic steering when a multi-PLMN connection is established for a user device, according to some aspects of the present disclosure. FIG. 5 will be described with reference to FIGS. 1-4. More specifically, FIG. 5 will be described from the perspective of 5GC 318 of PLMN-2 306 (a network controller) that has anchor UPF 402. It should be understanding that 5GC 318 and/or any NF within 5GC 318 may be executed by a component that has one or more memories with computer-readable instructions stored therein and one or more processors configured to execute the computer-readable instructions to implement steps of FIG. 5 described below. While the exemplary process of FIG. 5 is being described from the perspective of 5GC 318, it can similarly be implemented from the perspective of 5GC 310 of SNPN-1 304 as well.

At step 500, 5GC 318 may receive a request for a MA-PDU session from a user device (e.g., UE 302) with multiple PLMNs (e.g., SNPN-1 304 and PLMN-2 306). The request may include a "Multi access multi PLMN" flag for requesting multiple PLMN sessions. In one example, the request may include a new "MA-PDU Multi-PLMN" flag in MA-PDU session establishment request.

In association with such flag, a User Equipment Routing Selection Policy (URSP) rule at 5GC 318 may be extended to indicate "Multi access multi PLMN" in addition to "Multi access," "3GPP access," and "non-3GPP access," which are specified in TS 23.503. This extension of URSP rule may enable UE 302 to request a MA-PDU session based on the provisioned URSP rules. An example of such URSP rule is:

URSP Rule:

Rule Precedence=1.

Traffic descriptor:

IP descriptors=a.b.c.d/16.

Route selection descriptor:

DNN selection=DNN-1.

SSC Mode Selection=SSC Mode 3.

PDU session type=IPv6.

Network slice selection=S-NSSAI-1.

Access Type preference=Multi access multi plmn.

By performing steps 502, 504, and 506, 5GC 316 may generate an access transport steering switching and splitting (ATSSS) rule for steering traffic associated with the user device between at least two PLMNs (e.g., SNPN-1 304 and PLMN-2 306) once the multiple PLMN sessions are established between the user device (e.g., UE 302) and the at least two PLMNs. In one example, a the ATSSS rule defines a first set of parameters for steering the uplink network traffic between the first PLMN and the second PLMN, and a second set of parameters for splitting the traffic between second 3GPP access and the non-3GPP access within the second PLMN.

At step 502, during the establishment of a MA-PDU multi-PLMN session, PCF 316-1 may create Policy and Charging Control (PCC) rules that include information for controlling the network traffic steering across multiple accesses used by a MA-PDU multi-PLMN session. In addition to the existing information in the PCC rule such as Quality of Service (QoS) and charging information, the PCC rule can further specify how data packets matching the service data flows template of the PCC rule should be routed across 3GPP access of the multiple PLMNs (e.g., SNPN-1 304 and PLMN-2 306) and/or between a 3GPP access and non-3GPP accesses within a given one of the multiple PLMNs (e.g., between the 3GPP access and the non-3GPP access within PLMN-2 306).

FIG. 6 illustrates an example of enhancements to a PCC rule, according to some aspects of the present disclosure. Example PCC rule 600 of FIG. 6 may include a new block 602 (MA-PDU Multi PLMN block) in a non-limiting example of 2 PLMNs (SNPN-1 304 with only 3GPP access and PLMN-2 306 with both 3GPP access and non-3GPP access). Block 604 may specify conditions for steering network traffic between SNPN-1 304 and PLMN-2 306 (and/or between 3GPP access and non-3GPP access within PLMN-2 306). These conditions may include active-standby, smallest-delay, and load-balancing coupled with parameters including allowed access types, weights, etc.

Each of blocks 606 and 608 specify whether the PLMNs defined in block 602 have 3GPP access only or otherwise have 3GPP and non-3GPP access.

At step 504, 5GC 316 may convert (map) the PCC rule generated at step 502 to the ATSSS rule using SMF 316-2 to be sent to UE 302. In one example, ATSSS rule may include a precedence value identifying a priority of the ATSSS rule relative to other existing ATSSS rules. This precedence value may be useful for UE 302 to determine which ATSSS rule to utilize because UE 302 may receive multiple ATSSS rules or may receive the same ATSSS rule twice.

The ATSSS rule may further include a Traffic descriptor, which may identify a service data flow (SDF). It may include an Application ID, IP descriptors (Destination Address, Destination Port and Destination FQDN), non-IP descriptors, etc. The ATSSS rule may further include a PLMN ID for which a steering mode applies (e.g., PLMN ID of SNPN-1 304 and PLMN-2 306), and a steering mode, which may identify how the matching SDF should be steered across 3GPP and non-3GPP accesses.

At step 506, 5GC 316 may convert (map) the PCC rule generated at step 502 to a packet detection rule or an N4 rule using SMF 316-2 to be sent UPF 402 and UPF 312 of SNPN-1 304. In one example, the ATSSS rule is used for steering (e.g., splitting) the uplink network traffic of UE 302 and the packet detection/N4 rule is used for steering downlink network traffic destined for UE 302.

At step 508, 5GC 316 sends the ATS SS rule to the user device and the packet detection/N4 rule to the respective UPFs of SNPN-1 304 and PLMN-2 306. For example, PCFs of respective PLMNs (e.g., PCF 310-4 of 5GC 310 in SNPN-1 304 and PCF 316-4 in 5GC 316 of PLMN-2 306) may install the rules on the respective one of SMF 310-2 or SMF 316-2 to then be sent to the respective UPF 312 or UPF 402 and the respective AMF 310-1 or AMF 316-1.

In one example, UE 302 may receive the ATSSS rule multiple times or may receive the same ATSSS rule twice. Therefore, in one example, ATSSS rule may include a precedence value identifying a priority of the ATSSS rule relative to other existing ATSSS rules, a Traffic descriptor, which may identify a service data flow (SDF). It may include an Application ID, IP descriptors (Destination Address, Destination Port and Destination FQDN), non-IP descriptors, etc. The ATSSS rule may further include a PLMN ID for which a steering mode applies (e.g., PLMN ID of SNPN-1 304 and PLMN-2 306), and a steering mode, which may identify how the matching SDF should be steered across 3GPP and non-3GPP accesses.

An example of an ATSSS rule would be as follows: "PLMNs: SNPN-1, PLMN-2"; Steering mode: Load-balancing", "PLMN-Block:PLMN:2",Traffic Descriptor: UDP, DestAddr 1.2.3.4", "PLMN: 2", "Steering Mode: Active-Standby, Active=3GPP, Standby=non-3GPP"

According to this example, UDP network traffic with destination IP address 1.2.3.4 would be steered to the active access (3GPP), if available. If the active access is not available, the standby access (non-3GPP) is used for sending the network traffic to destination IP address 1.2.3.4.

In another example, the ATSSS rule can include: "Traffic Descriptor: TCP, DestPort 8080", "PLMN Id: 2","Steering Mode: Smallest Delay"

Figure 7:
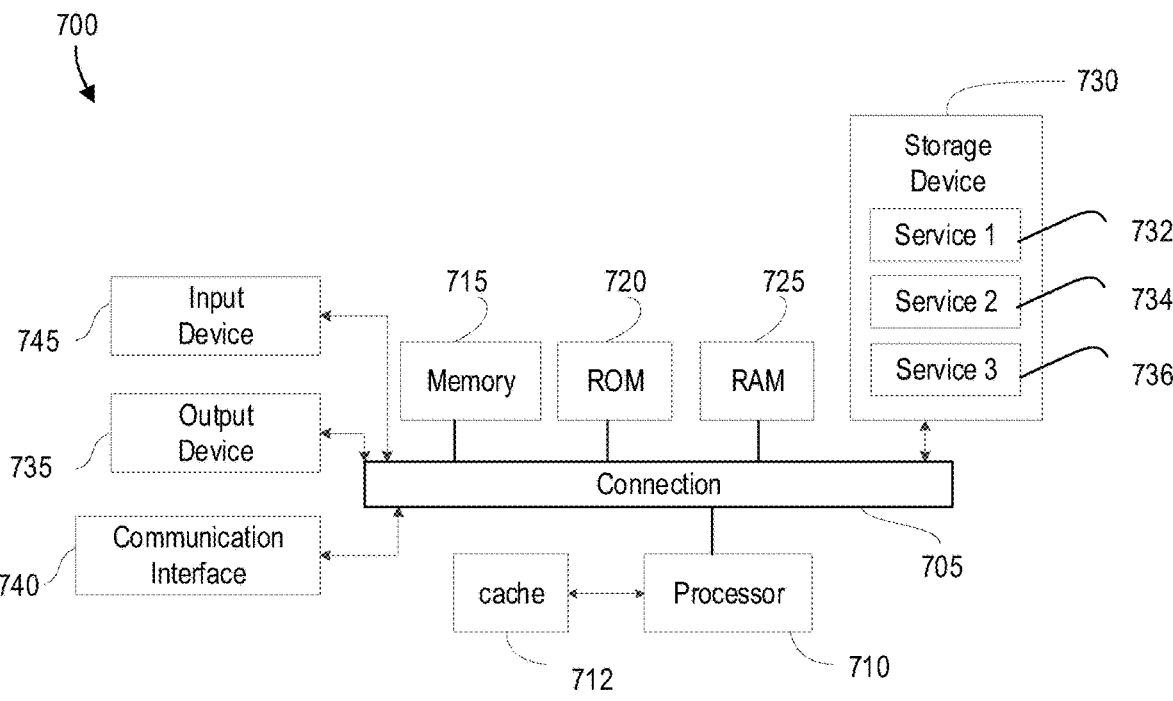
FIG. 7 illustrates an example computing system, according to some aspects of the present disclosure.

In this example, TCP network traffic with destination port 8080 would be steered to the access (3GPP access through SNPN-1 304, 3GPP access through PLMN-2 306, or non-3GPP access through PLMN-2 306 with the smallest delay. UE 302 may occasionally measure the RTT over both accesses, in order to determine which access has the smallest delay. In one example, when there are 3 accesses available to UE 302 (as shown in FIG. 4) then SNPN-1 304 network will connect via N3IWF—this is as per current 3GPP architecture FIG. 7 illustrates an example computing system, according to some aspects of the present disclosure. Example computing device 700 may be used any one of the network components described above with reference to FIGS. 1-6 including, but not limited to, UEs such as UE 302, various network controllers and components implementing NFs within 5GC 310 and 5GC 316, access points 308 and 310, non-3GPP access point 318-1, and/or any other components within the systems 100, 150, 200, 300, and 400. etc.

Example computing system 700 including components in electrical communication with each other using a connection 705 upon which one or more aspects of the present disclosure can be implemented. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random-access memory (RAM) 725 to processor 710. Computing system

700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

Figure 8:
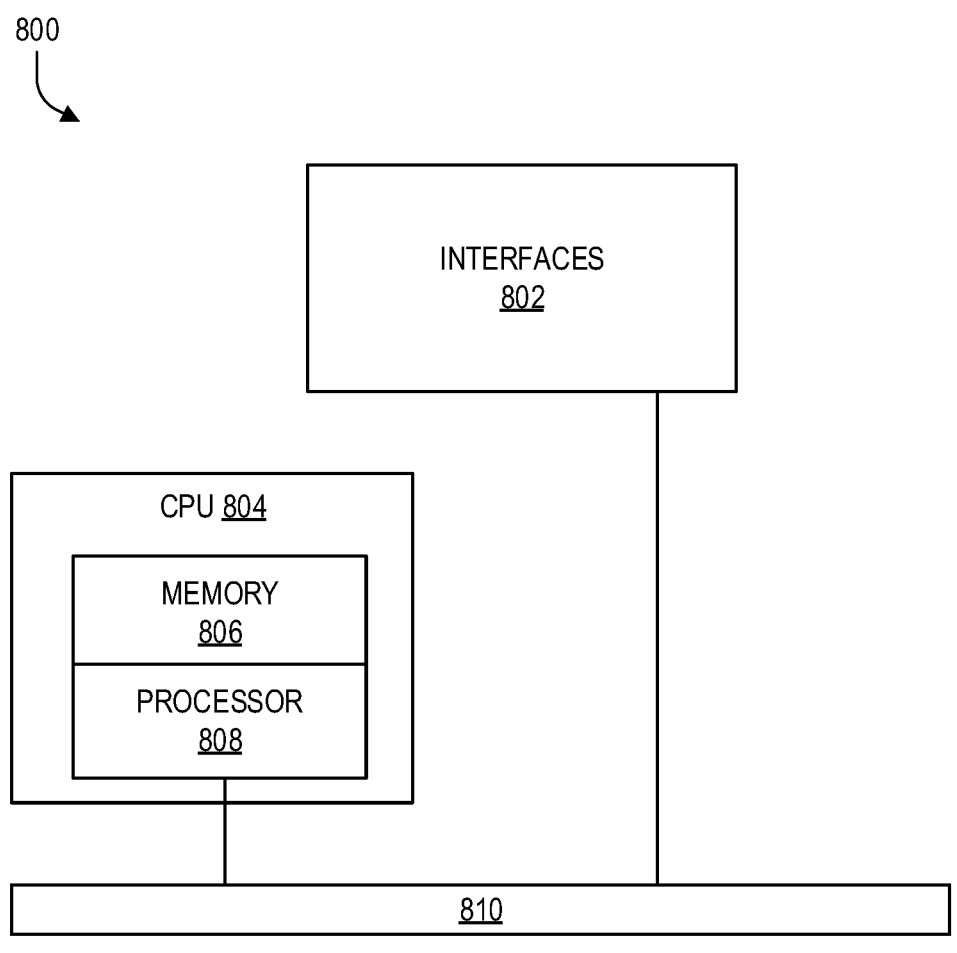
FIG. 8 illustrates an example network device suitable for performing switching, routing, load balancing, and other networking operations described with reference to FIGS. 1-6, according to some aspects of the present disclosure.

FIG. 8 illustrates an example network device suitable for performing switching, routing, load balancing, and other networking operations described with reference to FIGS. 1-6, according to some aspects of the present disclosure.

Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

receiving, at a network controller, a request for a Multi-Access Protocol Data Unit (MA-PDU) session from a user device, the request including a "Multi access multi PLMN" flag for requesting multiple Public Land Mobile Network (PLMN) sessions;

generating, at the network controller, a Policy and Charging Control (PCC) rule for steering network traffic associated with the user device, the PCC rule including Quality of Service, charging information, and one or more traffic descriptors for routing data packets;

converting, at the network controller, the PCC rule to an access transport steering switching and splitting (ATSSS) rule for steering the traffic between at least two PLMNs once the multiple PLMN sessions are established between the user device and the at least two PLMNs, the ATSSS rule having a plurality of elements embedded therein, wherein one of the plurality of elements is a precedence value indicative of priority of the ATSSS rule; and sending the ATSSS rule to the user device for splitting uplink network traffic transmitted between the user device and the at least two PLMNs based at least in part on the precedence value.

2. The method of claim 1, wherein a first PLMN of the least two PLMNs provides a first 3 GPP access for the user device and a second PLMN of the at least two PLMNs provides a second 3GPP access and a non-3GPP access for the user device.

3. The method of claim 2, wherein the ATSSS rule defines, a first set of parameters for splitting the uplink network traffic between the first PLMN and the second PLMN, and non-3GPP access within the second PLMN.

4. The method of claim 2, wherein the user device accesses the second PLMN via at least one of an NWu interface and an NWt interface.

5. The method of claim 1, wherein the request is based on a User Equipment Route Selection Policy (URSP) with an Access Type Preference field that includes the "Multi access multi PLMN" flag.

6. The method of claim 1, wherein the PCC rule is converted to the ATSSS rule using a Session Management Function (SMF) to be sent to the user device; and the PCC rule is converted to a Packet Detection rule or an N4 rule by the SMF to be sent to a User Plane Function (UPF), wherein the ATSSS rule is used for steering the uplink network traffic and the packet detection rule or the N4 rule is used for steering downlink traffic destined for the user device.

7. The method of claim 1, wherein the one or more traffic descriptors include an application identifier, a destination address, a destination port, a destination FQDN, and a non-IP descriptor; and the ATSSS rule further includes:

a PLMN ID for each of the at least two PLMNs to which the ATSSS rule for traffic steering applies; and a steering mode identifying how a matching SDF should be steered across 3GPP and non-3 GPP accesses, the steering mode being one of an active-standby mode, a smallest delay mode, a load-balancing mode, and a priority-based mode.

8. A network controller comprising:

one or more memories having computer-readable instructions stored thereon; and one or more processors configured to execute the computer-readable instructions to:

receive a request for a Multi-Access Protocol Data Unit (MA-PDU) session from a user device, the request including a "Multi access multi PLMN" flag for requesting multiple Public Land Mobile Network (PLMN) sessions;

generate a Policy and Charging Control (PCC) rule for steering network traffic associated with the user device, the PCC rule including Quality of Service, charging information, and one or more traffic descriptors for routing data packets;

convert the PCC rule to an access transport steering switching and splitting (ATSSS) rule for steering traffic associated with the user device between at least two PLMNs once the multiple PLMN sessions are established between the user device and the at least two PLMNs, the ATSSS rule having a plurality of elements embedded therein, wherein one of the plurality of elements is a precedence value indicative of priority of the ATSSS rule; and send the ATSSS rule to the user device for splitting uplink network traffic transmitted between the user device and the at least two PLMNs based at least in part on the precedence value.

9. The network controller of claim 8, wherein a first PLMN of the least two PLMNs provides a first 3GPP access for the user device and a second PLMN of the at least two PLMNs provides a second 3GPP access and a non-3GPP access for the user device.

10. The network controller of claim 9, wherein the ATSSS rule defines, a first set of parameters for splitting the uplink network traffic between the first PLMN and the second PLMN, and non-3GPP access within the second PLMN.

11. The network controller of claim 9, wherein the user device accesses the second PLMN via at least one of an NWu interface and an NWt interface.

12. The network controller of claim 8, wherein the request is based on a User Equipment Route Selection Policy (URSP) with an Access Type Preference field that includes the "Multi access multi PLMN" flag.

13. The network controller of claim 8, wherein the PCC rule is converted to the ATSSS rule using a Session Management Function (SMF) to be sent to the user device; and the PCC rule is converted to a Packet Detection rule or an N4 rule by the SMF to be sent to a User Plane Function (UPF), wherein the ATSSS rule is used for steering the uplink network traffic and the packet detection rule or the N4 rule is used for steering downlink traffic destined for the user device.

14. The network controller of claim 8, wherein the one or more traffic descriptors include an application identifier, a destination address, a destination port, a destination FQDN, and a non-IP descriptor; and the ATSSS rule further includes:

a PLMN ID for each of the at least two PLMNs to which the ATSSS rule for traffic steering applies; and a steering mode identifying how a matching SDF should be steered across 3GPP and non-3 GPP accesses, the steering mode being one of an active-standby mode, a smallest delay mode, a load-balancing mode, and a priority-based mode.

15. One or more non-transitory computer-readable media comprising computer-readable instructions, which when executed by one or more processors associated with a network controller, cause the network controller to:

receive a request for a Multi-Access Protocol Data Unit (MA-PDU) session from a user device, the request including a "Multi access multi PLMN" flag for requesting multiple Public Land Mobile Network (PLMN) sessions;

generate a Policy and Charging Control (PCC) rule for steering network traffic associated with the user device, the PCC rule including Quality of Service, charging information, and one or more traffic descriptors for routing data packets;

convert the PCC rule to an access transport steering switching and splitting (ATSSS) rule for steering traffic associated with the user device between at least two PLMNs once the multiple PLMN sessions are established between the user device and the at least two PLMNs, the ATSSS rule having a plurality of elements embedded therein, wherein one of the plurality of elements is a precedence value indicative of priority of the ATSSS rule; and send the ATSSS rule to the user device for splitting uplink network traffic transmitted between the user device and the at least two PLMNs based at least in part on the precedence value.

16. The one or more non-transitory computer-readable media of claim 15, wherein a first PLMN of the least two PLMNs provides a first 3GPP access for the user device and a second PLMN of the at least two PLMNs provides a second 3GPP access and a non-3GPP access for the user device.

17. The one or more non-transitory computer-readable media of claim 16, wherein the ATSSS rule defines:

the second PLMN, and a second set of parameters for splitting the traffic between second 3GPP access and the non-3GPP access within the second PLMN.

18. The one or more non-transitory computer-readable media of claim 15, wherein the request is based on a User Equipment Route Selection Policy (URSP) with an Access Type Preference field that includes the "Multi access multi PLMN" flag.

19. The one or more non-transitory computer-readable media of claim 15, wherein the PCC rule is converted to the ATSSS rule using a Session Management Function (SMF) to be sent to the user device; and the PCC rule is converted to a Packet Detection rule or an N4 rule by the SMF to be sent to a User Plane Function (UPF), wherein the ATSSS rule is used for steering the uplink network traffic and the packet detection rule or the N4 rule is used for steering downlink traffic destined for the user device.

20. The one or more non-transitory computer-readable media of claim 15, wherein the one or more traffic descriptors include an application identifier, a destination address, a destination port, a destination FQDN, and a non-IP descriptor; and the ATSSS rule further includes:

a PLMN ID for each of the at least two PLMNs to which the ATSSS rule for traffic steering applies; and a steering mode identifying how a matching SDF should be steered across 3GPP and non-3 GPP accesses, the steering mode being one of an active-standby mode, a smallest delay mode, a load-balancing mode, and a priority-based mode.

\* \* \* \* \*